(12) United States Patent
Scarpa

(10) Patent No.: US 6,375,424 B1
(45) Date of Patent: Apr. 23, 2002

(54) MAGNUS EFFECT HORIZONTAL AXIS WIND TURBINE

(75) Inventor: Paolo Scarpa, Rome (IT)

(73) Assignees: Sile S.R.L., Rome (IT); Medina Trading Inc., Columbia (PN); Fluid Service S.N.C., Rome (IT)

( * ) Notice: Subject to any disclaimer, the term of this patent is extended or adjusted under 35 U.S.C. 154(b) by 0 days.

(21) Appl. No.: 09/142,771

(22) PCT Filed: Feb. 14, 1997

(86) PCT No.: PCT/IT97/00031

§ 371 Date: Sep. 14, 1998

§ 102(e) Date: Sep. 14, 1998

(87) PCT Pub. No.: WO97/34083

PCT Pub. Date: Sep. 18, 1997

(30) Foreign Application Priority Data

Mar. 13, 1996 (IT) .......... RM96A0159
Jun. 14, 1996 (IT) .......... RM96A0422

(51) Int. Cl.$^7$ .............. B63H 9/02; F01D 1/36
(52) U.S. Cl. .............. 416/4; 416/155; 415/4.3; 415/908
(58) Field of Search .............. 416/4, 126, 110, 416/155; 415/4.3, 4.1, 908, 1; 290/44, 55

(56) References Cited

U.S. PATENT DOCUMENTS

| | | | | |
|---|---|---|---|---|
| 3,997,131 A | * | 12/1976 | King | 416/126 |
| 4,073,516 A | * | 2/1978 | King | 416/126 |
| 4,366,386 A | | 12/1982 | Hanson | 416/4 |

FOREIGN PATENT DOCUMENTS

| | | | |
|---|---|---|---|
| DE | 2734938 A1 | * | 2/1979 |
| DE | 3800070 A1 | * | 7/1989 |
| DE | 19529147 A | | 2/1996 |
| GB | 2031072 A | | 4/1980 |
| GB | 2179014 A | | 2/1987 |

* cited by examiner

*Primary Examiner*—F. Daniel Lopez
*Assistant Examiner*—Richard Woo
(74) *Attorney, Agent, or Firm*—Smith, Gambrell & Russell, LLP

(57) ABSTRACT

A turbine and method which employ kinetic and potential energy of a fluid to obtain mechanical and/or electric energy, is founded on the use of bulb shaped rotating blades that interact with a fluid, such as water or air, Each rotating blade rotates around its own axis and in the radial direction of the fluid itself.

18 Claims, 9 Drawing Sheets

MAGNUS EFFECT HORIZONTAL AXIS WIND TURBINE

BACKGROUND OF THE INVENTION

1. Technical Field

The invention relates generally to systems for converting fluid-dynamic energy, such as from air and water, into mechanical energy. In particular, the invention relates to an open or closed field turbine in a wind tunnel, or hydrodynamic tunnel, for converting kinetic and potential energy into mechanical/electrical energy in an open eolian or hydrodynamic plant.

Furthermore, the invention relates to a closed system where the conversion of energy occurs in an environment where pressure is regulated and maintained above the atmospheric, level.

2. Background Art

Eolian and hydrodynamic energy offers many advantages. It is widespread all over the country and does not cause pollution. Compared with other kinds of alternative energies, such as solar or geothermal energy, it is easily available as mechanical energy and consequently can be converted into electric energy.

Unfortunately, present conventional wing-blade aerogenerators have a limited power coefficient and produce relatively unstable work with respect to time. Efficient use of wind energy is considerably limited by low energetic concentration with average annual values of power per surface unit stroked by the blade reduced to the minimum. Efficiency is also impacted by daily and annual irregularities and variables.

Eolian plants are over-dimensioned with respect to the power generated because of the aforementioned problems and also because of the low energetic density that is obtained from wind. Eolian plants also must have great mechanical strength to tolerate strong winds.

Wind energy is essentially the kinetic energy of the mass of air in motion due to barometric or thermobaric atmospheric events. Therefore, the power effective available is proportional to the cubic wind speed, but it is also in a direct relation with the potential energy of the air mass due to the earth's gravity force (10000 $kg/m^2$—10 meters water column).

Dependence of power density on cubic wind speed sets forth the considerable influence that local ventilation characteristics have on technical and economic performances of an aerogenerator according to the prior art and makes the conversion of energy more complex. If the wind speed doubles, as it often happens for short periods, it is possible to obtain eight times the power and it is necessary to provide for a control system to skim the wind, reducing the blades stroke surface or lowering the efficiency of the rotor to avoid overloads. On the contrary if the speed reduces itself to one half, the converted power reduces itself substantially to an eighth, making it impossible to rely on the designed nominal power of the eolian plant.

Many kinds of rotors are known from the prior art, but the more tested recently have been rotors with a horizontal axis (parallel to the wind direction) that have fixed blades with a single blade, double blade, triblade, multiblade and cycloblade hub. Recently, the single blade system with a variable pitch terminal part of the rotor is being used in larger plants.

Conversion systems with a suitably shaped Magnus effect rotor that rotates with respect to the blade-holder hub, both central or peripheric, are not employed.

Patent RM 94 A 000529 owned by SILE/FLUID-SERVICE relates to a method for amplifying the dynamic surface pressure in mechanical machines where the dynamic surface pressure related to the fluid dynamic action of any gaseous or liquid composition is directed towards the external or lateral surfaces of an oppositely rotating thrust cylinder pair thus producing downstream of the cylinders themselves dynamic thrusts, which are greater than those obtained by means of a corresponding flat and static two-dimensional surface subjected to the same fluid dynamic thrust action.

Patent RM 94 A 000813 also owned by SILE/FLUID-SERVICE relates to a system for converting kinetic and potential energy in an eolian plant that channels fluid vein gathered by a concentrator into a central body where it interacts with the thrust rotors with an optimal incidence angle and where the reaction section with the rotors may be dimensionally regulated.

Furthermore, it is known that pressurization, a static method for filling a closed container with predetermined pressure according to the plant model, allows energetic density. This activates the kinetic component of the energy incident on a rotating element, to be increased when pressure and density are increased. Therefore, it is possible to work with low fluid speed and consequently low rotors speed even if working conditions are characterized by the same power and the same efficiency. In fluid-dynamics this may be related to the situation wherein, in a fall hydraulic system, the static head is a basic factor to define the dam power since flow rate is a fixed value that does not change with time. Therefore, if the hydrostatic basin supplies a limited power with the same section of fall tube, a greater fall pressure could be obtained by raising the basin.

Experimental work on Magnus effects started at the beginning of this century, and has been disclosed in a number of scientific international papers.

GB-A-2 031 072 discloses a wind energy exploitation system wherein the body of the blade does not rotate around its own axis but is hinged to a vertical shaft whose rotation movement generates electric energy. The blades lift when the wind speed increases in order to allow to take advantage also of weak winds.

In document GB-A-2 179 014, instead, the Magnus effect is exploited. This document uses this effect for the position control of a ship or for its propulsion, but not for generating energy.

U.S. Pat. No. 4,366,386 relates to a chiral turbine with "blades" which are perfectly cylindrical, and the turbine is placed in a non-pressurized environment.

Another example of the Magnus effect is the rotating cylinder used to power the Flettner and Cousteau rotor ship. Although cylindrical "blades" or "rotors" may be the best solution in the case of the Flettner and Cousteau rotor ship, they cannot be applied with practical and advantageous results in the case of a relative rotation between the "rotor" and the direction of the fluid in motion. This means, in particular, that the yield for the most common wind speeds over the course of the year (weak winds) would be low.

It should be noted that these solutions relate to an applicative method of the "translation" type, which involves a lift force distribution in KNm, in a parallel form, on the whole surface of the rotating cylinder.

According to the dynamical point of view, both in the eolian and hydrodynamic environment, a geometric configuration is not suited for a rotating blade that must also rotate on a rotation axis with different corresponding peripheral velocities that increase from the root of the "propeller" towards the terminal region of the blade, where the peripheral velocity has the largest value.

Consequently, a cylindrical configuration from the root to the end of the turbine (or propeller) is not adequate for the dynamical exploitation of all velocities related to the Magnus effect.

BRIEF SUMMARY OF THE INVENTION

The mathematical computation, the numerical simulation, and the already realized turbines, have demonstrated that, in order to obtain a dynamically correct form, the geometric configuration of the rotating rotor (blade) must assume a particular geometric shape, that is a "bulb" shape, on the distal end of the rotating blade itself.

The inventor generally refers to an inventive rotor having a bulb-shaped geometry as a "chiral rotor" or a "chiral turbine." The meaning of the word "chiral" is an opposite dynamic action (180°) as will appear from the description (see for instance FIG. 4).

The inventive chiral turbine is a new machine which is suited to exploit the dynamical components and the potential of any fluid substance in motion at slow velocity. Examples of these fluid substances include free air (wind), free water (rivers with low hydrostatic pressure and with a low speed of the water stream in m/s), gaseous composition (air or nitrogen in pressurized circuits).

Under the engineering point of view it is recommended to use the following definitions:

chiral turbine: complete machine including the blade units chiral rotor: single blade unit bulb, or chiral bulb: peripheral body of the blade.

An object of the present invention is to provide a method and a turbine operating in a closed or open (free air-river stream) cycle system to convert kinetic and potential energy in an eolian environment, and more generally in a fluid-dynamic environment, wherein the rotating blades interacting with fluid vein are provided with their own rotation motion around their more extended axis. This make is possible to exploit pressure amplifying effects resulting from the Magnus effect, in a particular blade shape.

Another object of the present invention is to provide a method for converting energy associated with fluid-dynamic actions in a pressurized environment, which allows lower involved work speeds, by means of machines based on the application of the Magnus effect principle, at the same time maintaining high efficiency and a high conversion rate of kinetic and potential energy in electromechanical energy.

Still another object of the present invention is to provide a method for converting energy associated with fluid-dynamic actions in a pressurized environment, that permits reduction of the dimensions of plants and machines where the conversion of energy associated with the fluid-dynamic action is performed.

A last object of the present invention is to provide a method and a chiral turbine with an open or closed system in a wind tunnel for converting eolian kinetic and potential energy, in a pressurized environment and more generally in a fluid-dynamic and hydrodynamic ambit. Although this invention implies a new conception according to the basic principles of the same invention, it applies known technologies and constituent materials making the invention easier to carry out.

These and other objects, which will appear from the description below, are attained by means of a system where rotating blades constituting the interaction means with the fluid in motion, are shaped as lengthened structure with a bulb-shape end and are constituted as chiral rotors that are able to rotate on their own more extended axis according to the Magnus effect principles, besides in the radial direction according to fluid advance direction.

Such bulb shape allows the best exploitation of rototranslation speed components of the rotating blade and of the incident kinetics. It is for this reason that blades under a fluid-dynamic action are equivalent to an accelerated mass, which is placed in the zone of an energetic and potential differential, caused by the spin rotation. Therefore, the accelerated mass of the chiral rotor is subjected to the attraction resulting from a pressure jump, which produces aerodynamic lifts and falls.

Hence, the rotation of chiral blades cause a condition of kinetic and energetic differential asymmetry in the space where the pressure potential is reduced. As this occurs just in the proximity of the translating mass (chiral rotor), the same is subjected to the induced pressure differential, defining aerodynamic lifts and falls.

A temporary relative energetic unbalance, to restore the symmetry with respect to pressure variation, produces a feedback which makes the mass (chiral rotor) subject to the potential differential that has been established between the two bodies: chiral rotor—fluid. This produces a considerable thrust pressure on the chiral rotor.

According to another aspect of this invention, a method in which a fluid is introduced in an environment, closed by means of a containment vessel, where pressurization is obtained by means of compressors arranged in complementary structures is shown. Said closed environment is subdivided into a first fluid vein delivery section comprising a sequence of bipolar rotors and into a second fluid vein return section, which lies inside the first section, and comprises a second sequence of bipolar chiral rotors.

Fluid is directed in such a direction to collide with the first sequence of bipolar chiral rotors. Each one rotates around its own axis and is arranged coupled in a multistage sequence 180° out of phase one respect to the other, in the couple arrangement, wherein the containment vessel shape is such that at the end of the first multistage sequence of chiral rotor couples, air flows are conveyed in the return direction, in a couple of return conveyors where the aforesaid second sequence of chiral rotors are arranged, allowing the optimal exploitation of the fluid vein and of the present static potential to be reached, through their serial arrangement.

BRIEF DESCRIPTION OF DRAWINGS

Some embodiments of the invention are described hereinafter with reference to the attached drawings, for the sole purpose of better explaining it and without thereby limiting its scope and the number of its possible applications. Said drawing showing individually.

DETAILED DESCRIPTION OF THE INVENTION

It must be underlined that for explanatory purposes the representations have been schematically drawn, thus eliminating constructive details which would be obvious and unnecessary for describing the preferred embodiment.

Figure 1:
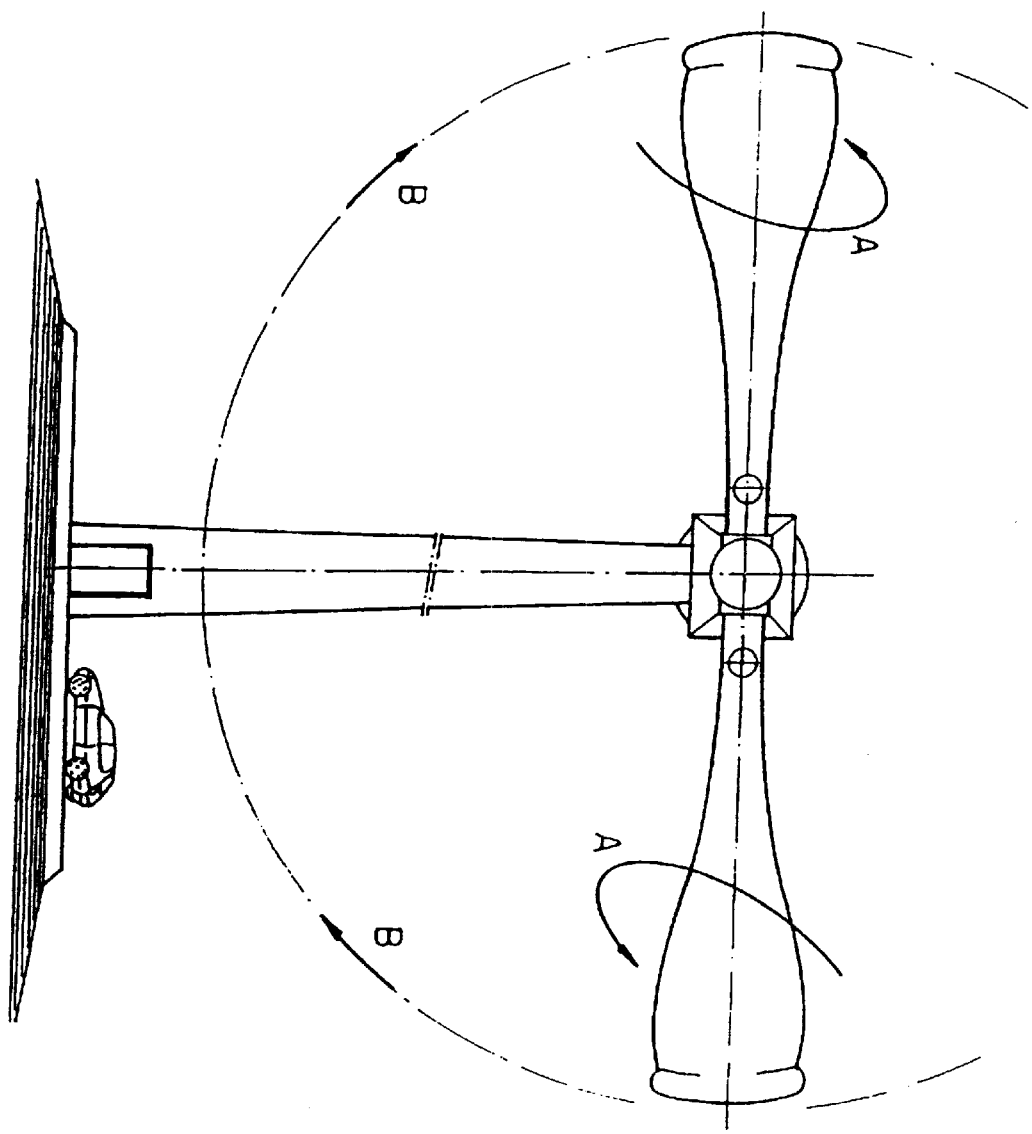
FIG. 1, a view of a plant for exploiting eolian energy according to the present invention in an open cycle embodiment.

Moreover, the reference number of the nine figures corresponds to the same mechanical functional element. A general view of an eolian plant is shown in FIG. 1, arrows A and B indicate the direction of the rotation the blades are subjected to.

Figure 2:
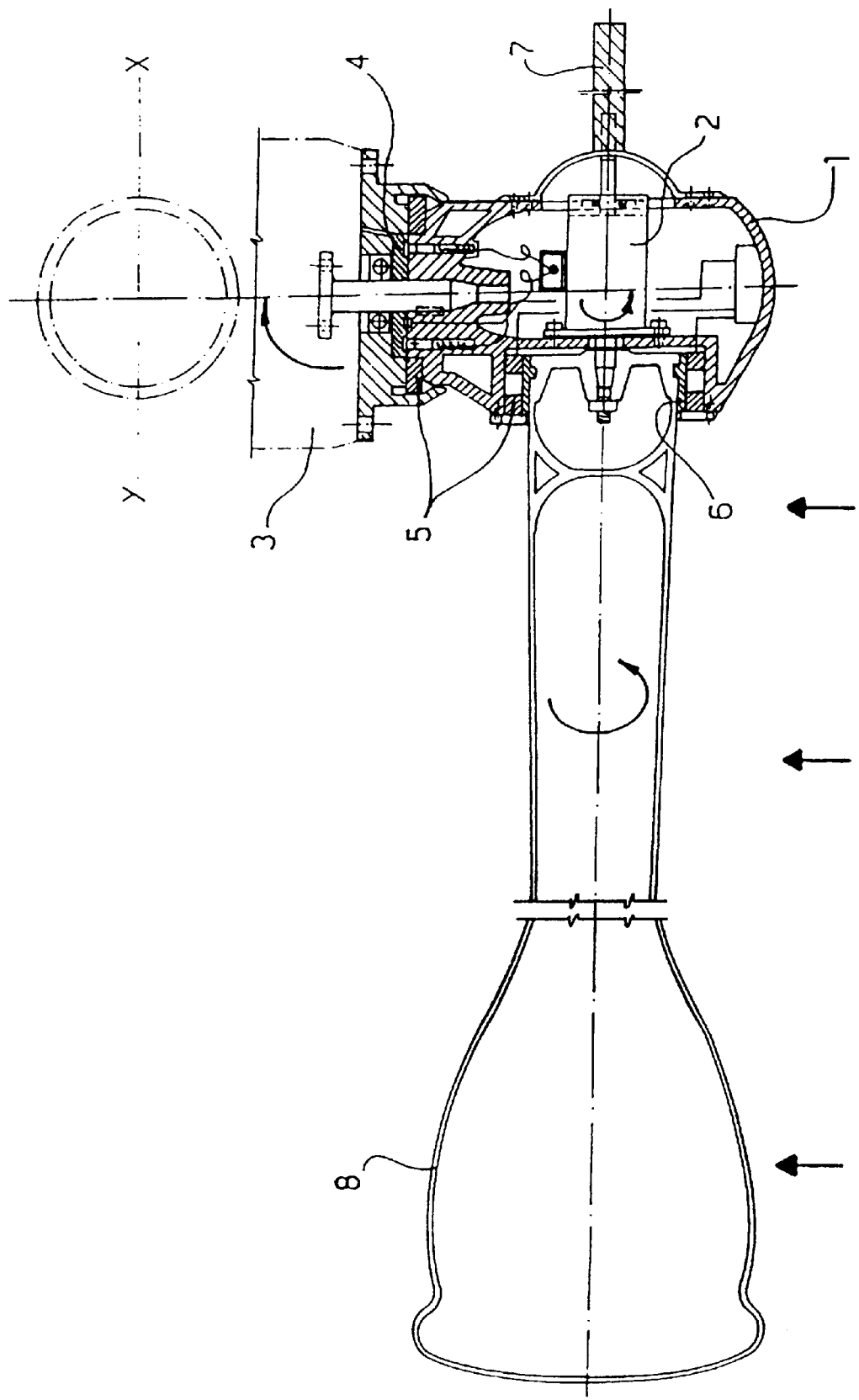
FIG. 2, a section of the blade/structure unit supporting the blade.

FIG. 2 instead shows a sectional structure of a chiral blade and of a supporting structure that is interfaced with the central hub chiral blade itself. A hub 1 supports rotating blade 8 built in such a way as to contain a DC or AC motor closely fitted on the terminal portion of the rotating blade. The hub 1 is constituted so as to take into account the static and dynamic stresses deriving from the double rotation, both of the hub 1 itself and of rotating blade 8, using active magnetic bearings or other rolling contact systems. An A.C. or D.C. motor 2 driving rotating blade 8, fit to work with various speed, in a wide speed range, according to the dynamic load on the rotating blade or other magnetic driving unit. An over gear 3, common for these uses. A sliding contact (Pacinetti type) ring 4 for electromagnetic feeding to the electric motor 2, to the bearings, the guides and their control system. A magnetic active bearings 5 matching and balancing the rotating mass. Magnetic guides 6 closely fitted on self-bearing load structure of chiral blade. A closely fitted counterweight 7 on the opposite side of the rotating blade. A rotating blade 8, of the self supporting kind, built from composed material with a high absorption like the fibre tissue of Dyneema with glass fiber, having an inserted mesh of "bees nest" cells that reinforces high dynamic stressed portions. A high mechanical strength polymer compound with a very low specific weight is suitable for this purpose. Rotating blade 8 and the terminal bulb are built in their optimal geometric configuration, taking into account the numerical results provided by the computer which carries out a numeric simulation of the laboratory model and taking into account aerodynamic, or hydrodynamic and mechanical requirements.

Of course single blade plant described could be made also as double blade, triblade or multiblade plant taking into consideration an increased mechanical cost for moving rotating blades and the cost of a supporting blade.

The chiral turbine for converting kinetic and potential energy as described above, is clearly only illustrative of a type of turbines that work with various kind of fluids (air-water), but which can use the same basic principles. Typical examples are hydraulic applications, like river dams or, more generally, river barriers which perform the transformation of kinetic and potential energy associated with water.

It is possible to use the same chiral blade system and double blade, triblade or multiblade, with peripheral bulb, in water, obtaining the same effects that have been obtained in the air. This type of plant kind doesn't change substantially, only the speeds of rotation with respect to the hydraulic flow change.

Figure 3:
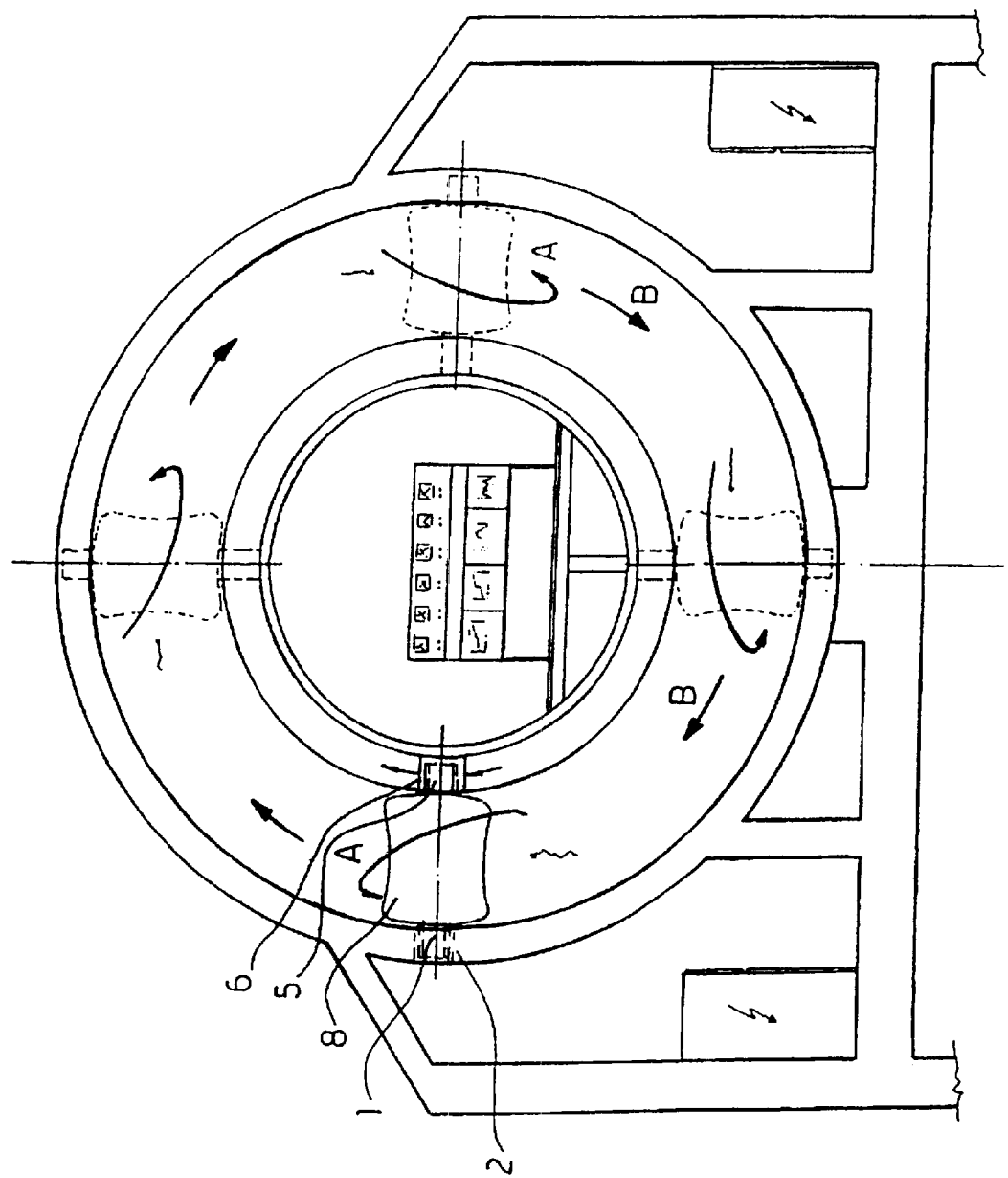
FIG. 3, a section of the chiral rotor of the plant for the exploitation of kinetic and potential energy according to the present invention, in a closed cycle embodiment, that is in a wind tunnel.

The proposed chiral turbine is particularly suitable for tide flows with a remarkable hydrostatic gradient and specifically for rivers with great runflow canals. In FIG. 3 a further embodiment of an apparatus according to this present invention is shown; it should be underlined that the reference number refers to the same components indicated in previous figures, and that rotation directions A and B indicate the composite rotation motion of two oppositely rotating systems.

In this embodiment the intubated eolian plant with a single rotating chiral blade differs from the one previously described because it is inserted in a circular peripheral container structure, or external guides with the hub I which holds the rotating blade 8 having a structure according to the dynamic stresses produced by the rotation and translation of both the hub 1 itself and the rotating blade 8, by means of active bearings or other rolling contact system. Said blade holder hub 1 carries out the function of the central hub in previously described plans, and the effective physical and dynamic functions of chiral bulb remain unchanged. Furthermore the bulb 8 is reduced, with respect to previous structures, to a particular maximum speed peripheral zone: in fact the supporting blade stem and the relative speed reducer which involve an efficiency much lower than one are eliminated.

Various bulbs 8 may be placed at equal angles, on the external circumference according to the particular embodiment.

By means of such a system, forces are discharged directly on the containment magnetic circular guides which, effectively, become a linear motor-generator. In this embodiment the chiral bulb behaves substantially as a linear current generator and, as for the single blade or double blade chiral rotor with a lengthened shape, this embodiment may be improved by means of suitable active bearings 5 matching and balancing the rotating mass.

In this way it is possible to obtain the optimal performances with efficiencies better than those obtainable from traditional machines: the interconnection of speed reducers, (which as said before, are characterized by a low efficiency), are eliminated and the plant is structured in a closed cycle system with chiral blades, in a sequence, that exploits residual kinetic energy at any passage of the chiral unit.

Figure 4:
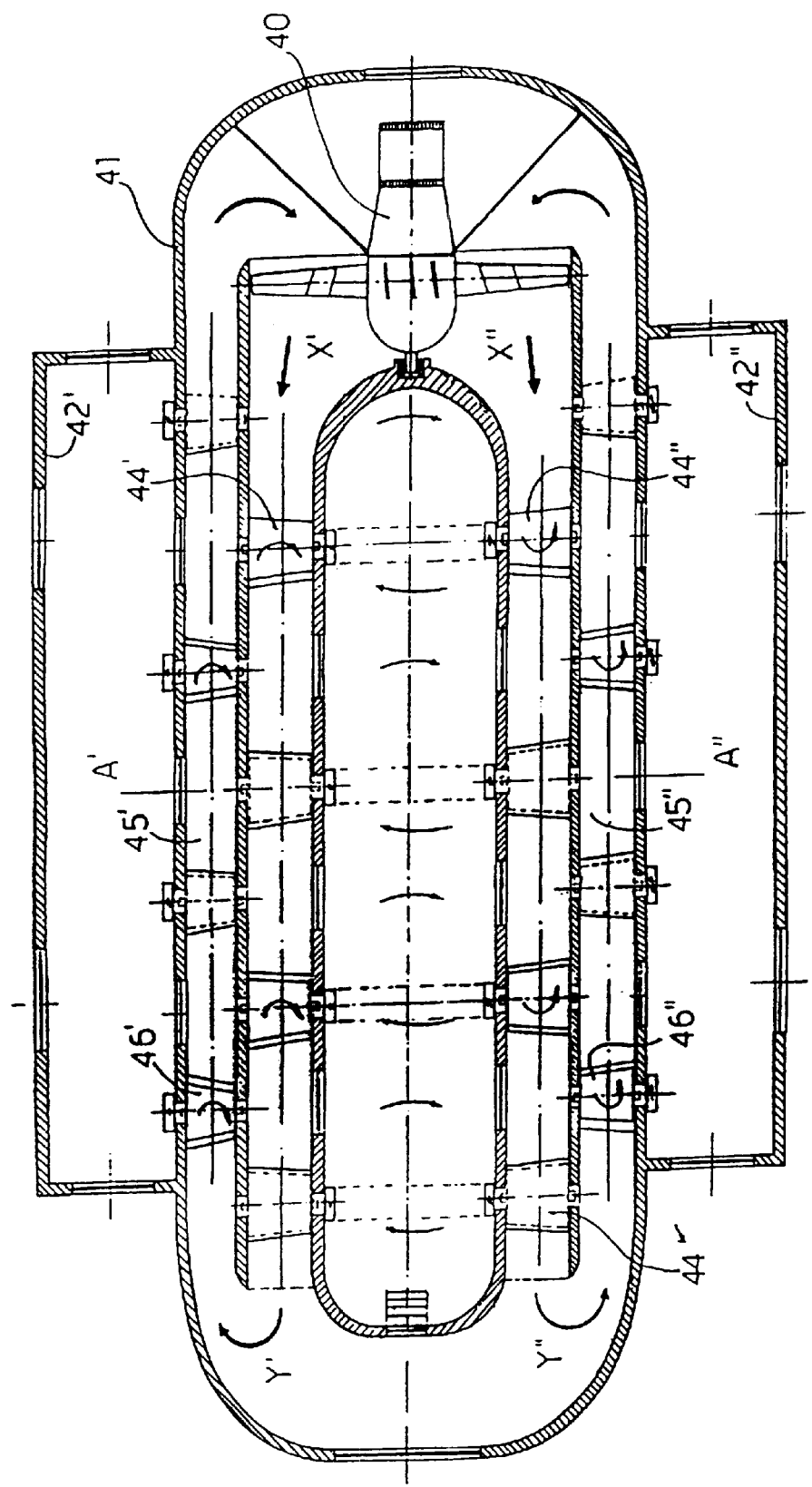
FIG. 4, a longitudinal section of a plant for converting energy associated with fluid-dynamic actions in a pressurized environment.

In FIG. 4 a section of a conversion plant in a pressurized environment is shown. The electrofan 40 in FIG. 4 (but the following applies also to the plant in FIG. 8) produces an air flow in a tunnel, that is an environment closed externally by means of a containment vessel 41. Inside this tunnel a pressurization by means of compressors arranged in complementary structures 42', 42" is produced. The tunnel is subdivided into two sections:

a delivery section comprising a sequence of bipolar rotors 44', 44", . . . 44$^n$;

a return section comprising a sequence of bipolar rotors 46', 46", . . . 46$^n$.

Air flow produced by the electrofan 40 is directed in the directions X', X" in such a way to invest the sequence of bipolar rotors 44', 44", . . . 44$^n$, each one rotating on its own axis. The bipolar rotors are arranged coupled in a multistage sequence—a four stage sequence in the particular case of FIG. 4—and the couples are 180° out of phase one respect to the other. The shape of the containment vessel is such that at the end of the multistage sequence of chiral bulb couples 44, the air flows are conveyed in the directions Y', Y", in a couple of return conveyors 45', 45", where further sequences of chiral bulbs 46', 46", are arranged. In this way the optimal exploitation of fluid vein produced by the electrofan 40, where to the air flow itself returns to be brought again into the closed cycle, is obtained.

It should be noted that the sequential disposition of several bipolar rotors 44 and 46 yields also a serial sum of the single powers produced by the single bulbs: total output power is the result of the optimal exploitation of potential and kinetic energy associated with the whole fluid vein.

An intuitive example, that makes the value of involved powers and speeds concrete, may clarify of the pressurization effect in this kind of structure.

The described apparatus, when working with a fluid speed of 40 mt/s, supplies a power rating of 139 MW; a power rating of 750 MW is obtained in the case speed is risen to 80 mt/s and the pressurization is not changed. In order to obtain such rating power level without working in a 80 mt/s speed regime, it is enough to increase the pressure in the container structure 11 up to 8 atm, making the fluid speed decrease until 40 mt/s.

It should be noted that, by the energetic point of view, the effective cost to obtain the pressurization is minimum, because it depends on the maintaining of a particular pressure level in a closed/isolated environment with respect to the barometric changes or with respect to the flow density; even if this does not occur with respect to the gravitational forces, because of the effect of involved active chiral means.

Figure 5:
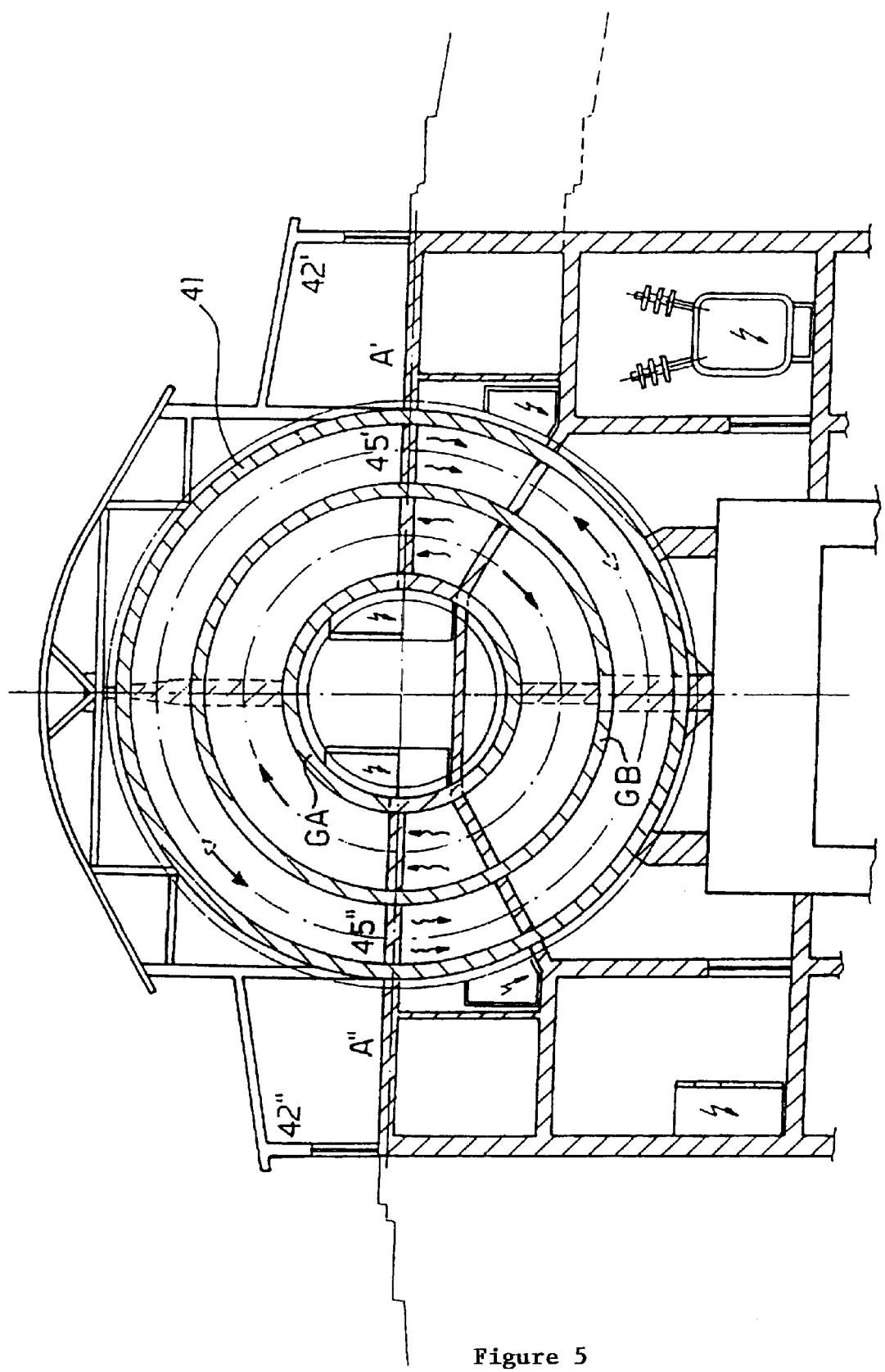
FIG. 5, a global cross section of the whole plant for converting energy associated with fluid-dynamic actions, into electric energy, in pressurized environment.
Figure 6:
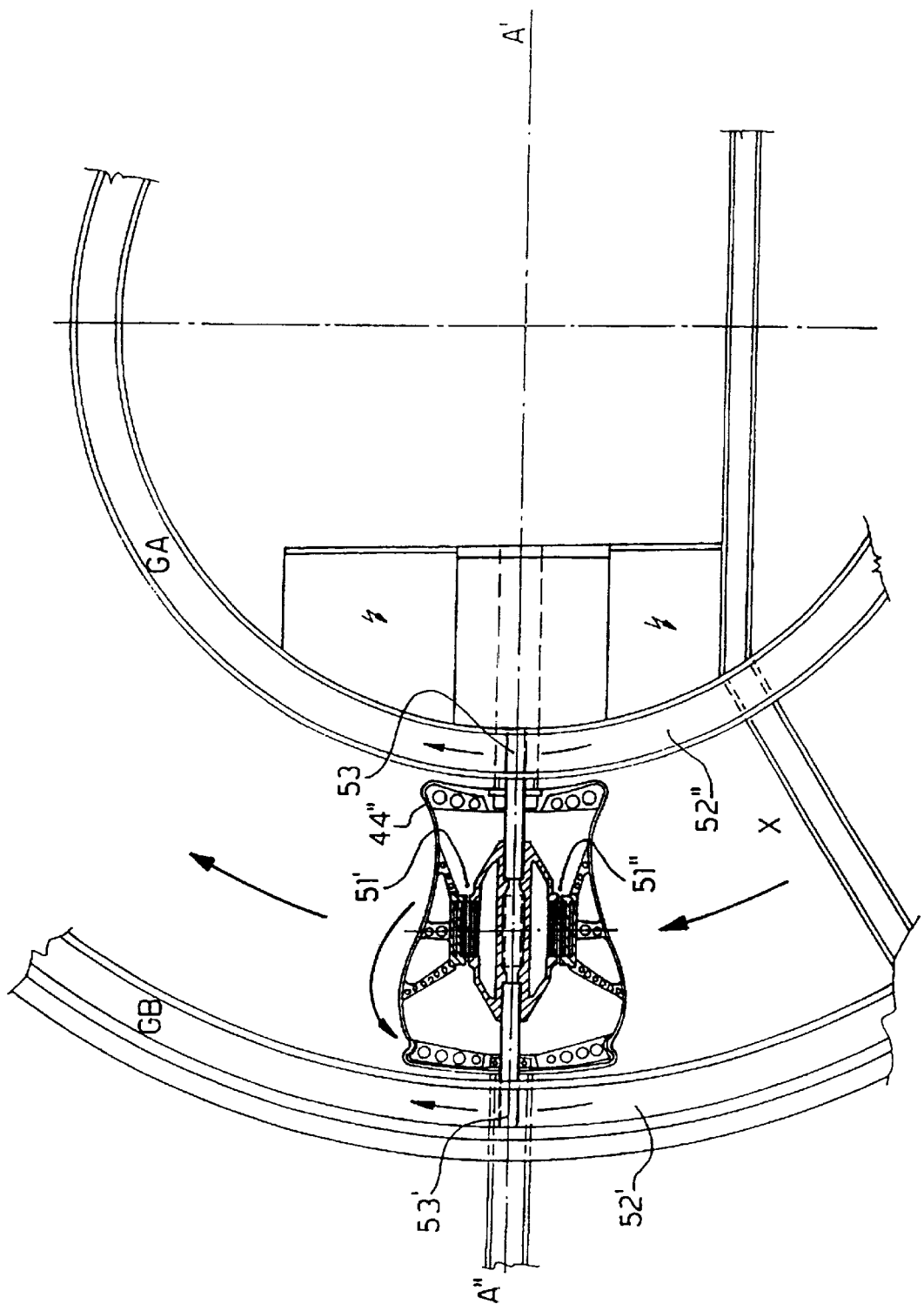
FIG. 6, a cross section of the chiral rotor unit according to FIG. 4.

In FIGS. 5 and 6, another section, (along a plan corresponding to the line A'-A" of FIG. 4), of the apparatus embodying the method according to the present invention is shown. These figures take into consideration the structure of a chiral rotor 44 where the two electromagnetic windings 51'-51" for the rotor rotation, around its own axis, as well as light material chiral rotor structure, are set forth.

Figure 7:
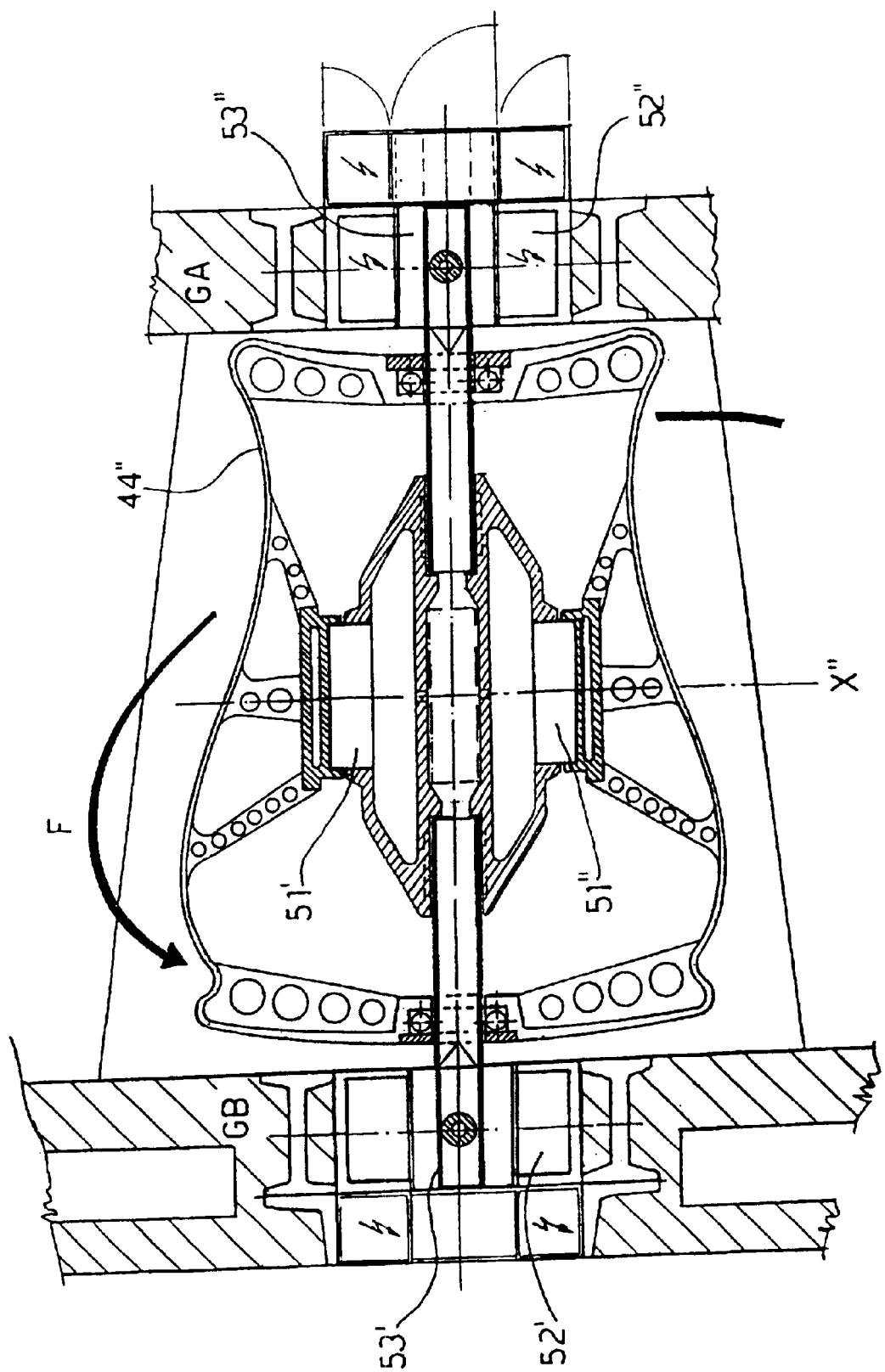
FIG. 7, a view from the top, of a section of the chiral rotor unit according to FIG. 4.

Furthermore, it is possible to consider another rotor, placed diametrically opposed and 180° out of phase, with respect to the one in the figure, in the more external zone of the apparatus embodying the present invention; it is also possible to plan another couple of chiral rotors externally to the one shown in FIG. 6, which allows to exploit the return flow coming from the electrofan, while the shown rotor is arranged to be stroked only by the delivery of flow X". When the rotor starts rotating it behaves as a rotor of a linear electric motor, in which statoric part is constituted by the two frameworks GA and GB where brushes means 52' and 52" with their relative pole shoes 53' and 53", as clearly shown in FIG. 7, are placed. FIG. 7 is a section, from the top, of the same chiral rotor shown in FIG. 6; said systems have the task to convert energy from the static and fluid-dynamic potential and from the original fluid-dynamic mechanism 40, into electric energy, through the combined deviation Magnus effects. It should be noted that, preferably, the steel section frameworks, contain the linear generator statoric part which passes through the whole framework on both sides.

The two opposite bipolar, chiral rotors, which define lifts and falls, behave like two rotors of the Flettner roto-ship, where the linear generator, behaving as the loan, is the ship. The analogy is even more appropriate because of the low speed regime obtained by means of pressurization which allows a high vortical efficiency, in the U-shaped region of the chiral turbine. Of course a practical embodiment of the primary blower motor may be carried out through a peripheral blade turbine to be inserted directly into the tunnel frameworks and dividing, if necessary, the driving power in the two tunnel sections; this system allows to reduce spaces and to improve fluid-dynamic efficiency of dynamic flows in motion.

Nowadays by means of extra light technologies and composed materials, structures are realized, characterized by an excellent resistance to toil and dynamics stresses, even if they are not heavy structures.

This considerable weight reduction allows a very limited electromagnetic drive powering, both in the electric section and in the electromagnetic speed regulation section. Therefore energetic costs for activating chiral turbines are very low and insignificant for the global efficiency of the system.

Figure 8:
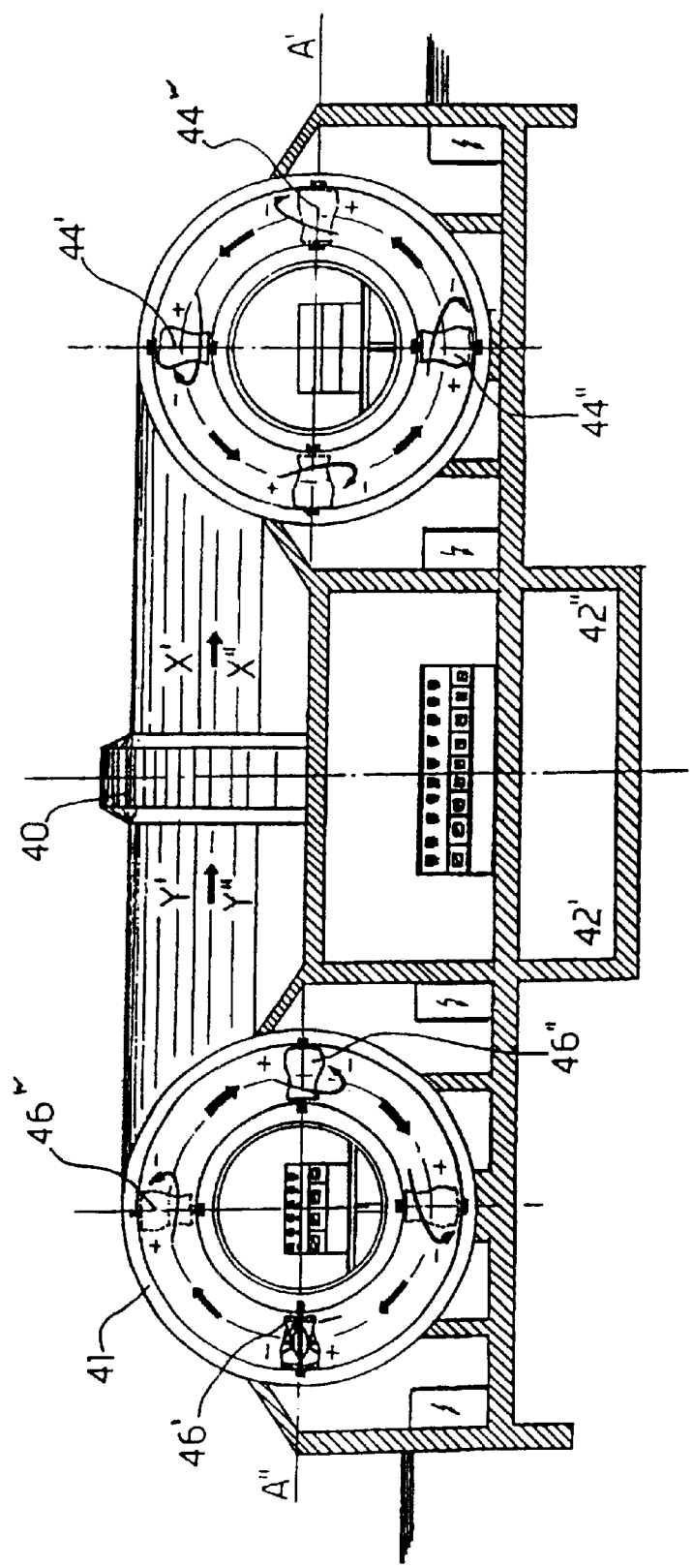
FIG. 8, a view of an embodiment of the circular wind tunnel kind, as a toroidal ring, in a pressurized environment according to the method of the present invention.

In FIG. 8 a section along the usual plan A'-A", of a further embodiment of the present invention, is shown; this embodiment is based on a toroidal closed structure, which offers the advantage of not having a return section in the wind tunnel, and obtaining homogeneous circulation and limited air pressure drops along the intubated circuit 41.

As previously described, by employing the same kinetic energy, such system allows a conversion of the static and dynamic potentials with the maximum efficiency, considering the work requirements of the pressurization which allows an effective space reduction, an improved "quality factor" of the dynamic system according to the invention and a simplified construction. In a further embodiment, instead of being arranged in a bipolar structure, the chiral bulbs may be inserted in the tunnel structure both in tripolar and quadripolar structure in such a way as to lower peripheral speeds of bulbs themselves. In this way operative requirements of a low peripheral speed under the same production of electric energy, consistently with electromagnetic work load is complied with.

Figure 9:
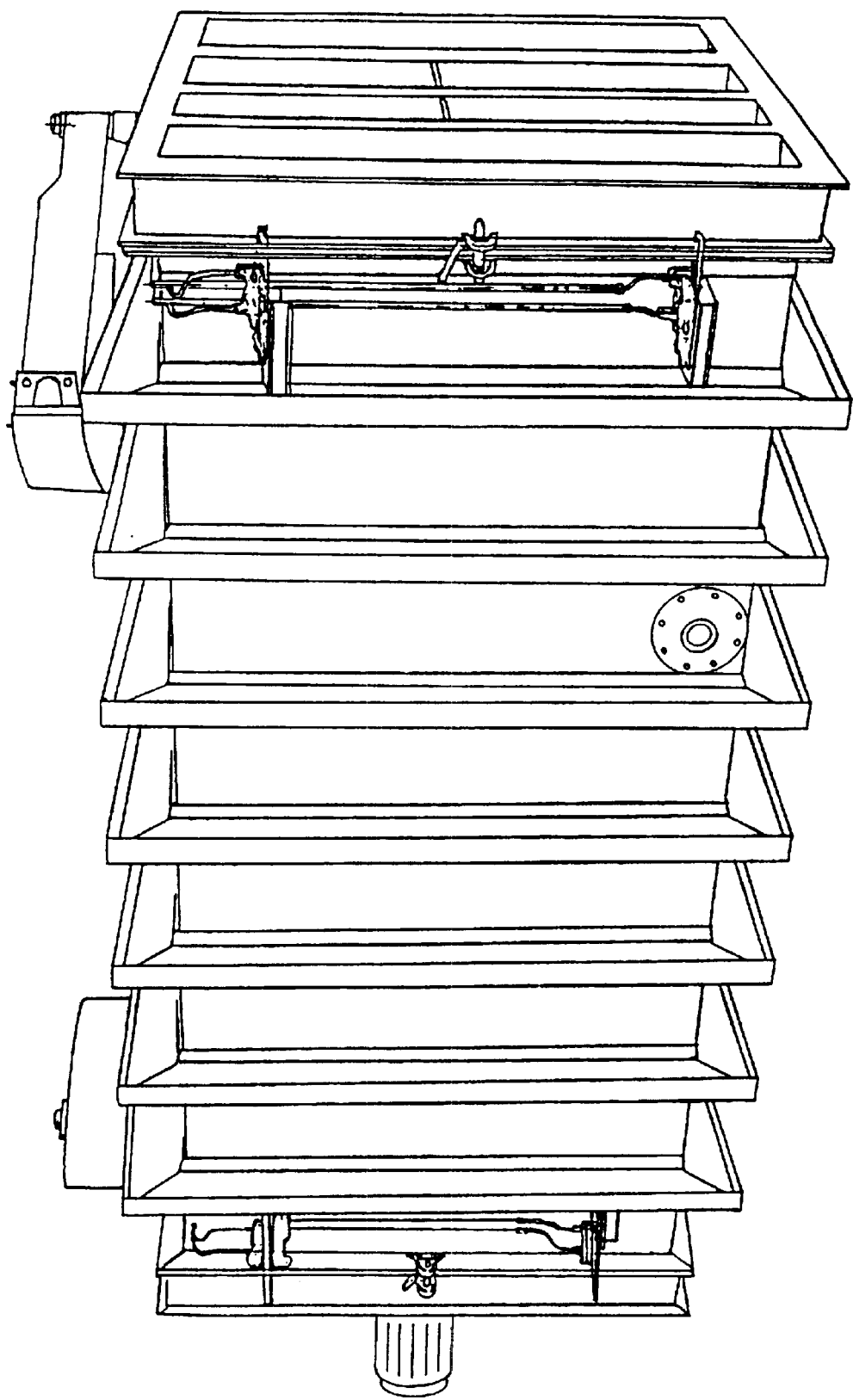
FIG. 9, an external drawing of the containment vessel of the plant for converting energy associated with fluid-dynamic actions, in a little electric pressurized plant.

FIG. 9 shows an external drawing of a pressurization cell, according to the method of the present invention. Said cell is built in a rectangular shape rather than in a cylindrical shape, as for usual pressurized tanks; the rectangular shape comes from the experience and from the necessity to perform the maintenance of electromagnetic and movable mechanical parts. Said system, already used for vacuum stations, offers remarkable space advantages, disassembling facilities, complete opening of cell, quick maintenance of electromagnetic parts. Modules of these cells, as the one shown in FIG. 9, are already known. They have a length up to 11 mt with a cross surface of 9 $m^2$.

These electric ministations are particularly suitable for small factories, hospitals, hotel plants, civil and industrial agglomerates, naval motors, etc.

More generally according to the present invention the method and the plant may be employed as kinetic energy accumulators, in motor vehicles such as motor-cars, trucks, buses, motor-lorries, aircraft, orbital space stations, ships, boat motors. Such accumulation of kinetic and potential energy allows the maximum energetic saving and the minimum pollution due to the fluids or compounds employed.

Of course, the produced energy can be used to produce, both electric energy and heat by means of suitable diathermic oil heat exchangers and consequently, hot water, overheated vapor, low pressure vapor, middle pressure vapor as well as all general services for industry or public and private buildings.

It is worth taking into consideration a further aspect of the application of chiral turbines and of the Magnus effects starting from the fact that reversibility is an intrinsic condition of all fluid-dynamic machines. If instead of working as a converter of potential and kinetic energy, chiral rotors are employed in an inverse action, that is to say moved by a motor, keeping their characteristics of chiral rotation produced by the respective driving motors, a fluid-dynamic moving is obtained that can be sent, as a lift or as a fall, as regards to the earth reference system, according to the right handed or left handed rotation, respectively. Considering the possibility to use this system as a vertical lift system, like the one produced by the rotors of a traditional helicopter, the main difference with traditional rotors is that with chiral rotors there is no pumping and spin activity of incident air but there is the component relative to a considerable hole of potential and of pressure: under a qualitative point of view; such pressure hold works similarly to when an aeroplane enters into an air pocket, but in the opposite way.

What is claimed is:

1. A turbine for converting energy associated with fluid-dynamic actions comprising:
    a bulb-shaped rotating blade which rotates around its own extended axis according to the Magnus effect principles.

2. A turbine according to claim 1, further comprising:
    a central hub supporting said bulb-shaped rotating blade;
    magnetic active bearings attached to said central hub;
    magnetic guides fitted on the bulb-shaped rotating blade;
    an electric motor;
    an overgear;
    a static rotating ring with sliding electric contacts for electromagnetic feeding to the electric motor, the magnetic active bearings, guides, and to their control system.

3. A turbine according to claim 2, further comprising a single bulb-shaped rotating blade.

4. A turbine according to claim 2, further comprising multiple bulb-shaped rotating blades.

5. A turbine according to claim 1, further comprising:
    a circular peripheral container structure.

6. A turbine according to the claim 1 having one bulb-shaped rotating blade.

7. A turbine according to the claim 1 having more than one bulb-shaped rotating blade.

8. A conversion plant comprising:
    a tunnel;
    a containment vessel;
    a compressor;
    said tunnel is divided into a delivery section and a return section;
    said delivery section further comprises a first sequence of chiral rotors;
    said return section further comprises a second sequence of chiral rotors.

9. A conversion plant according to the claim 8, wherein fluid exiting the second sequence of chiral rotors enters the delivery section.

10. A conversion plant according to the claim 8, wherein each chiral rotor works effectively as the rotor of a linear electric motor, in which the statoric pan is constituted by two frameworks where bush means are placed with their relative pole shoes having said bush means the task of converting original potential and fluid-dynamic/mechanical energy to electric energy.

11. A conversion plant according to the claim 8, wherein the containment vessel is a toroidal circular ring having a sequence of chiral rotors disposed on the toroidal circular ring.

12. A conversion plant according to the claim 11,
    wherein the sequence of chiral rotors comprises six bipolar rotors.

13. A conversion plant according to claim 11, wherein the chiral rotors are bipolar, tripolar, or quadpolar shaped.

14. A turbine according to the claim 11, wherein the toroidal circular ring further comprises a sequence of eight chiral rotors disposed along the circular perimeter.

15. A method for converting energy associated to fluid-dynamic actions, in which a plurality of rotors are disposed transversally with respect to the moving fluid, said rotors constituting the interaction means with the moving fluid and being formed by rotating blades, which rotate around their own axis in order to take advantage of the principles of the Magnus effect, and which are further rotated by the fluid itself in a plane arranged transversally to the moving fluid, the method being characterized in that at least one rotating blade has a bulb shape.

16. A method according to claim 15, characterized in that said rotating blades are utilized in a pressurized environment.

17. A method according to claim 16, characterized in that a bulb which is deprived of the stem of the "blade", is used in the method itself, wherein said rotor or bulb slides along frameworks that form the statoric part of a linear motor, whereas pole shoes form the magnetic moving parts; the rotation of the bulb being effected by means of sliding electric contacts which supply electromagnetic windings.

18. A turbine for converting energy associated with fluid-dynamic actions comprising:
    a rotating blade having a distal portion that is bulb shaped which rotates around its own extended axis according to the Magnus effect principles.

* * * * *